United States Patent
Rossnan

[15] 3,696,465
[45] Oct. 10, 1972

[54] METHOD OF PREPARING CRAB BODIES FOR THE REMOVAL OF THE MEAT THEREFROM

[72] Inventor: Michael Rossnan, 11724 Lovejoy Street, Silver Spring, Md. 20902

[22] Filed: March 19, 1971

[21] Appl. No.: 124,740

[52] U.S. Cl. ................................................17/48
[51] Int. Cl. ............................................A22c 29/00
[58] Field of Search......................17/48, 71, 73, 72

[56] References Cited

UNITED STATES PATENTS

| | | | |
|---|---|---|---|
| 2,903,737 | 9/1959 | Ward | 17/48 |
| 3,274,640 | 9/1966 | Rossnan | 17/48 |

Primary Examiner—Lucie H. Laudenslager

[57] ABSTRACT

This invention relates to the method for preparing cooked crab bodies for the removal of the contents of the mid-section first, and secondly the meats of the body cavities, by opening these cavities to permit the center entrail cavity to be cleared entirely by fluid pressure, such as water alone or with air or suction, so that the meat in the remaining cavities may also be removed by suction, fluid pressure such as air, water and combined air and water pressure, with means for severing the crab body in two parallel lines to have clear openings for the withdrawal of the meat from all of such cavities by suction, or fluid pressure such as air pressure, water pressure and the combination of suction, air and water pressure, or by hand.

6 Claims, 4 Drawing Figures

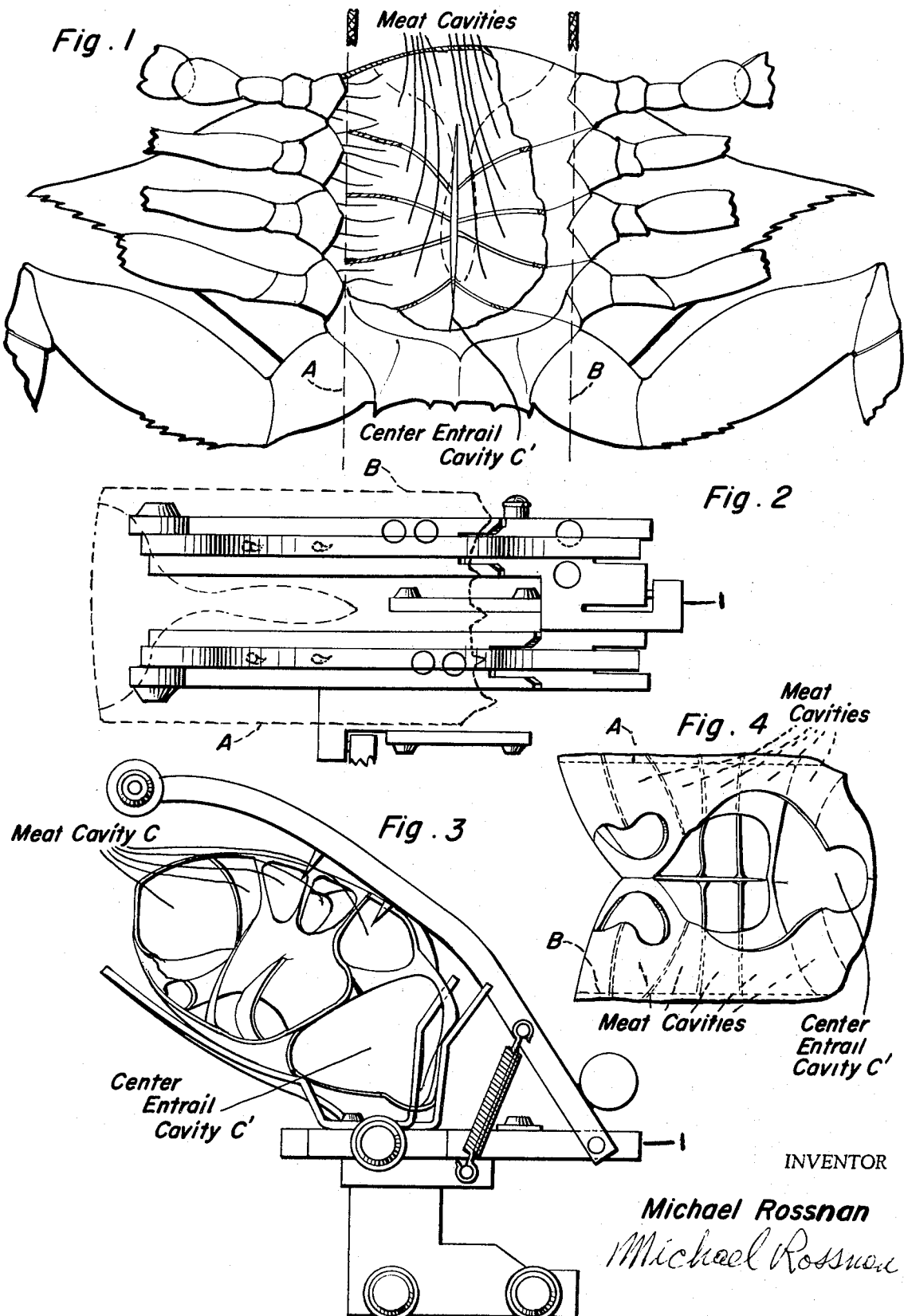

METHOD OF PREPARING CRAB BODIES FOR THE REMOVAL OF THE MEAT THEREFROM

The present invention relates to improvements in methods of preparing crab bodies for the removal of the meat therefrom, and one object of the invention is the provision of means to cut the crab body in three sections, so that the contents of the center entrail cavity can be first removed by fluid pressure, such as air pressure, or water pressure, although suction may be used, and then to remove the meat from the remaining cavities by suction, or fluid pressure, such as air pressure, water pressure, the combined water, air and/or suction, or by hand. Examples of providing fluid pressure change are clearly shown in my previous U.S. Pat. Nos. 3,249,962, 3,257,683; 3,274,640, and 26,136.

One of the objects of this invention is to so open the meat cavities of the body of the cooked crab that the meat may be thoroughly removed by several methods, namely by causing the crab body to have its cavities form the openings or outlets of air under pressure, be blown out directly, or sucked out by air, or flooded out by water under pressure.

In order that the invention may be fully understood and its advantages appreciated, attention is invited to the accompanying drawings, in which:

FIG. 1 is a plan view of the underside of a crab body as it appears when ready for sawing to provide three sections, and dash lines showing where the saws cut the body;

FIG. 2 is a top view of the mobile crab holder with sawed crab body shown in dotted lines;

FIG. 3 is a side view of sawed crab in holder showing the center entrail cavity and all the body meat cavities; and FIG. 4 is a top view of the crab body with the top shell removed showing the meat cavities and the center entrail cavity.

Referring to the drawings, and in particular to FIGS. 2 and 3 of the drawings the numeral 1 designates the crab body mobile holder, which may be moved intermittently or at a steady selected speed, and carries the crab.

The cooked crab body with all its members is passed through the sawing operation so that the two rotary disk saws cut the body on lines A and B, to open the cavities C, carrying the body meat, as well as the entrance to the center entrail cavity C'.

By this preparation, water or air and water under pressure forced or suction is applied through one end of the center entrail cavity C' of the body, and this removes all of the entrail contents, leaving the other cavities free to have the meat removed by suction or fluid pressure, which may be water pressure, air pressure or the combination of suction, air and water pressure.

From the foregoing description taken in connection with the drawings, it will be seen that this method prepares the cooked crab body so that the entrail contents of the center section of the crab can be removed, and then all of the body cavities containing the meat are opened so that this meat can be removed by suction, fluid pressure such as air pressure, water pressure, or the combination of suction, air and water pressure, or by hand.

What is claimed as new is:

1. A method of preparing cooked crab bodies for the removal of the contents thereof, comprising sawing through the body in two parallel lines to have free access to the meat therein, removing the contents of the center entrail cavity thereof, and secondly removing the meat from the meat cavities.

2. A method as claimed in claim 1, wherein the contents from the center entrail cavity are removed by the application of fluid pressure such as suction, air pressure, water pressure or any combinations thereof.

3. The method as claimed in claim 1, wherein water under pressure is used to remove the contents of the center entrail cavity.

4. A method as claimed in claim 1, wherein the contents of the center entrail cavity are removed of its contents by water and air pressure, and the body meat cavities are removed by fluid pressure.

5. A method as claimed in claim 1, wherein the contents of the center entrail cavity are removed by fluid pressure and the body meat cavities by suction.

6. A method as claimed in claim 1, wherein the cavities and center entrail cavities are removed by fluid pressure such as suction, fluid pressure such as air pressure, water pressure and combined water and air pressure.

* * * * *